United States Patent [19]
Maus et al.

[11] Patent Number: 6,143,099
[45] Date of Patent: Nov. 7, 2000

[54] PROCESS FOR THE PRODUCTION OF A BRAZED HONEYCOMB BODY USING SHEETS OF A LAYER-LIKE CONFIGURATION

[75] Inventors: Wolfgang Maus, Bergisch Gladbach; Ludwig Wieres, Overath, both of Germany

[73] Assignee: Emitec Gesellschaft fuer Emissionstechnologie mbH, Lohmar, Germany

[21] Appl. No.: 09/028,234

[22] Filed: Feb. 23, 1998

Related U.S. Application Data

[63] Continuation of application No. PCT/EP96/03676, Aug. 21, 1996.

[30] Foreign Application Priority Data

Aug. 22, 1995 [DE] Germany ............................. 195 30 871

[51] Int. Cl.[7] .................................................. C21D 9/50
[52] U.S. Cl. ........................ 148/530; 148/534; 148/535; 228/181; 228/262.42
[58] Field of Search .................................... 148/529, 530, 148/534, 535; 228/181, 193, 262.31, 262.42

[56] References Cited

U.S. PATENT DOCUMENTS

| | | | |
|---|---|---|---|
| 3,605,255 | 9/1971 | Metzger et al. ........................ | 29/494 |
| 3,769,101 | 10/1973 | Woodward ............................... | 29/487 |
| 4,602,001 | 7/1986 | Cyron ...................................... | 502/439 |
| 4,658,437 | 4/1987 | Bose et al. ........................ | 228/262.42 |
| 4,713,217 | 12/1987 | Stern ................................. | 228/262.31 |
| 5,366,139 | 11/1994 | Jha et al. ............................... | 225/193 |

FOREIGN PATENT DOCUMENTS

| | | |
|---|---|---|
| 0 159 468 B1 | 10/1985 | European Pat. Off. . |
| 29 47 694 A1 | 9/1981 | Germany . |
| 34 40 498 A1 | 5/1985 | Germany . |
| 37 24 005 A1 | 2/1989 | Germany . |
| 0 514 138 A1 | 11/1992 | Germany . |
| 89/07488 | 8/1989 | WIPO . |

*Primary Examiner*—George Wyszomierski
*Attorney, Agent, or Firm*—Herbert L. Lerner; Laurence A. Greenberg; Werner H. Stemer

[57] ABSTRACT

A process for the production of a brazed honeycomb body with sheets having a layer-like configuration, includes stacking and/or winding sheet metal layers at least partially having a structure for forming passages through which a fluid can flow. At least a portion of the sheet metal layers is initially formed of a layered material having at least one layer of chromium-containing steel and at least one substantially aluminum-containing layer. The aluminum-containing layer is substantially homogenized in a later heat treatment and the heat treatment is effected firstly under a vacuum or in a reducing and then an oxidizing atmosphere. The heat treatment is part of a brazing procedure in which contact locations between the sheet metal layers are brazed together at least in partial regions by the addition of brazing material.

6 Claims, 2 Drawing Sheets

PROCESS FOR THE PRODUCTION OF A BRAZED HONEYCOMB BODY USING SHEETS OF A LAYER-LIKE CONFIGURATION

CROSS-REFERENCE TO RELATED APPLICATION

This application is a continuation of International Application PCT/EP96/03676, filed Aug. 21, 1996, which designated the United States.

BACKGROUND OF THE INVENTION

Field of the Invention

The invention relates to a process for the production of a honeycomb body in which sheet metal layers that are at least partially structured for forming passages through which a fluid is able to flow, are stacked and/or wound in layer-wise manner.

A honeycomb body of the above-indicated kind is known, for example, from International Publication WO 89/07488, corresponding to U.S. Pat. No. 5,102,743. The honeycomb body serves as a carrier for a catalyst which promotes the conversion of components of an exhaust gas, in particular an exhaust gas from an internal combustion engine, into compounds which are less environmentally polluting. The honeycomb bodies are exposed to high levels of mechanical and thermal loading. Besides the mechanical and thermal loadings, the sheet metal layers are exposed to an atmosphere which promotes corrosion. It is therefore desirable to use sheet metal layers which have a high degree of resistance to corrosion for producing a honeycomb body.

U.S. Pat. No. 5,366,139 discloses using sheet metal layers for honeycomb bodies which firstly are formed of a layered or laminate material. Such sheet metal layers have at least one layer of chromium-containing steel and at least one substantially aluminum-containing layer. A sheet metal layer of that kind is subjected to a heat treatment, with the sheet metal layer being substantially homogenized. The expression "homogenization of the sheet metal layer" is used to denote diffusion of the aluminum into the steel so that the result is essentially a single-layer sheet of steel with aluminum.

U.S. Pat. No. 5,366,139 discloses firstly implementing the heat treatment under vacuum or in a reducing and finally an oxidizing atmosphere. The treatment of the sheet metal layer in the oxidizing atmosphere causes the formation on the sheet metal layer of an oxide skin or a film which serves in particular as a bonding layer for a washcoat that is to be subsequently applied. The production of such sheet metal layers is relatively cost-intensive since the sheet metal layers have to be subjected to a heat treatment for homogenization purposes.

SUMMARY OF THE INVENTION

It is accordingly an object of the invention to provide a process for the production of a brazed honeycomb body using sheet metal layers of a layer-like configuration, which overcomes the hereinafore-mentioned disadvantages of the heretofore-known processes of this general type, which is inexpensive to produce, but which is corrosion-resistant and can withstand mechanical loadings.

With the foregoing and other objects in view there is provided, in accordance with the invention, a process for the production of a honeycomb body, which comprises initially forming sheet metal layers at least partially of a layered or laminate material having at least one chromium-containing steel layer and at least one substantially aluminum-containing layer; subsequently substantially homogenizing the chromium-containing steel and aluminum-containing layers in a heat treatment initially under a vacuum or in a reducing and then in an oxidizing atmosphere as part of a brazing procedure; at least partially brazing together contact locations between the sheet metal layers in the brazing procedure with a brazing material based on nickel and containing between 0.5 and 8% by weight and preferably between about 3 and 6% by weight of boron; and stacking and/or winding the at least partially structured sheet metal layers to form passages for conducting a fluid flow.

The process according to the invention provides for a reduction in the costs of production of a honeycomb body since a preceding heat treatment for substantial homogenization of the layered material is eliminated and such homogenization is effected by the supply of heat to the sheet metal layer, as is required for implementing the brazing procedure. Accordingly, homogenization of the sheet metal layers formed of a laminate material is achieved in a single heat treatment operation in the production of the honeycomb body. Furthermore, on one hand the heat treatment step provides for the formation on the sheet metal layers of an oxide coating or film which serves as a bonding layer for the washcoat, and on the other hand it provides for effecting the brazing procedure as such.

In accordance with another mode of the invention, after the attainment of a maximum temperature during the cooling phase an atmosphere with a low oxygen partial pressure and in particular an oxygen partial pressure of less than 1 Torr is used. An operating procedure of that kind affords the advantage of producing an aluminum oxide layer which is particularly suitable as a bonding primer for a washcoat, on the sheet metal layers.

In accordance with a further mode of the invention, by virtue of the way in which the process is implemented and due to the use of a layered or laminate material which has at least one layer of chromium-containing steel and at least one substantially aluminum-containing layer, the brazing material can be a nickel-based brazing material, with the maximum brazing temperature being between 1100 and 1150° C.

As mentioned above, the brazing material contains between 0.5 and 8% and in particular between 3 and 6% boron. Boron in the brazing material serves as a diffusion accelerator so that it affords a reduction in the amount of time required for the brazing procedure, with equivalent brazed joints. A reduction in the period of time for the brazing procedure has the result of making it possible to achieve higher through-put rates through a brazing furnace. In addition, the boron provides for an improved wetting behavior on the part of the brazing material and thus high-quality brazed joints.

In accordance with a concomitant mode of the invention, the heat treatment is firstly effected in a temperature range in which the brazing material does not yet melt. After extensive homogenization of the layered or laminate sheets, the temperature is raised to the melting temperature of the brazing material. That operating procedure has the advantage of ensuring that substantial homogenization of the layered or laminate sheets is achieved and then a durable brazed connection is produced.

Other features which are considered as characteristic for the invention are set forth in the appended claims.

Although the invention is illustrated and described herein as embodied in a process for the production of a brazed honeycomb body using sheets of a layer-like configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
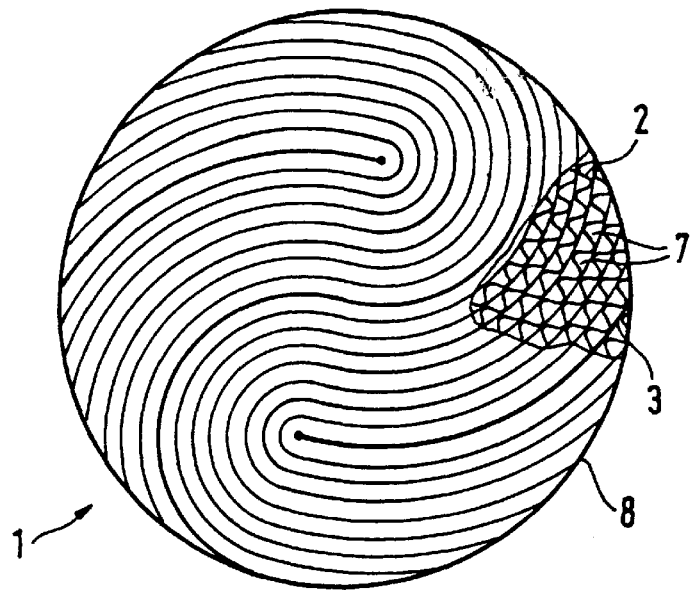
FIG. 1 is a diagrammatic, front-elevational view of a honeycomb body in accordance with the state of the art.
Figure 2:
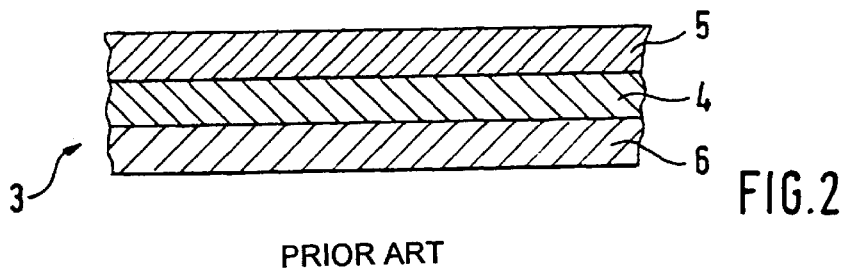
FIG. 2 is an enlarged, fragmentary, sectional view of a sheet metal layer with a laminate structure in accordance with the state of the art.

Referring now to the figures of the drawings in detail and first, particularly, to FIG. 1 thereof, there is seen a honeycomb body 1. The honeycomb body 1 is formed of sheet metal layers which are stacked and wound in a layer-wise manner and which are resistant to high-temperature corrosion. The honeycomb body 1 is produced from alternate layers of smooth and corrugated sheet metal layers 2, 3. The smooth sheet metal layers 2 are formed of a substantially homogenous steel containing at least chromium and aluminum. As is seen in FIG. 2, the corrugated sheet metal layers 3 have a layered or laminate structure. The layered sheet metal layers 3 include an inner layer 4 of a chromium-containing steel. As can also be seen from FIG. 2, respective layers 5, 6 which essentially are formed of aluminum are disposed on each of the two sides of the inner layer 4. The sheet metal layer 3 of layered or laminate structure illustrated in FIG. 2, is of an appearance as it is prior to heat treatment. The honeycomb body 1 which is produced from sheet metal layers that are stacked and wound in a layer-wise manner has a structure forming passages 7 through which a fluid can flow. The sheet metal layers are disposed in a tubular casing 8. A layer which is essentially formed of aluminum is preferably disposed on the inside of the tubular casing 8, at least in partial regions thereof. However, the tubular casing 8 can also be connected to the sheet metal layers alone or in addition through the use of conventional brazing procedures.

Figure 3:
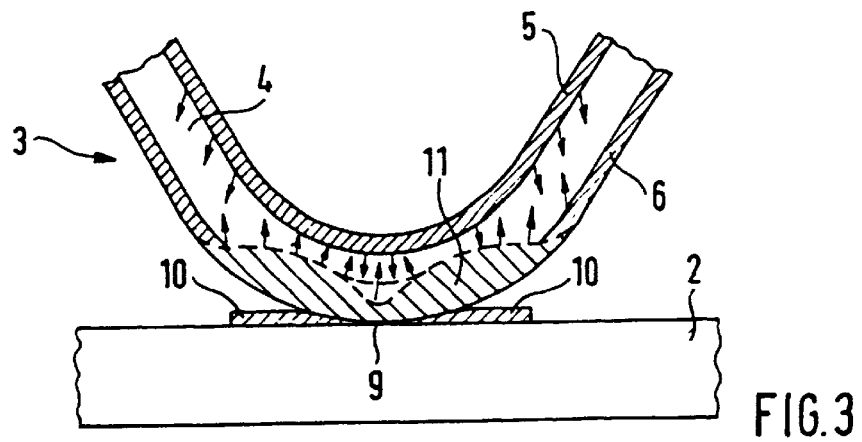
FIG. 3 is a fragmentary, sectional view of a contact location between a sheet metal layer of a laminate structure and a sheet metal layer of a substantially homogenous steel during a homogenization operation.

FIG. 3 shows a contact location between a smooth sheet metal layer 2 and a corrugated sheet metal layer 3. The corrugated sheet metal layer 3 has a layered or laminate structure. A brazing material inlay 10 is disposed between the corrugated sheet metal layer 3 and the smooth sheet metal layer 2 in a region around a contact location 9. FIG. 3 shows a snapshot during a portion of a heat treatment in which the laminate structure of the sheet metal layer 3 is homogenized. During the heat treatment step aluminum which is contained in the layers 5 and 6 diffuses into the inner layer 4. The direction of diffusion of the aluminum is indicated by arrows. An almost homogenized zone 11 is already formed in a lower bend portion of the corrugated sheet metal layer 3. The homogenization temperature is below the melting temperature of the brazing material inlay 10.

Figure 4:
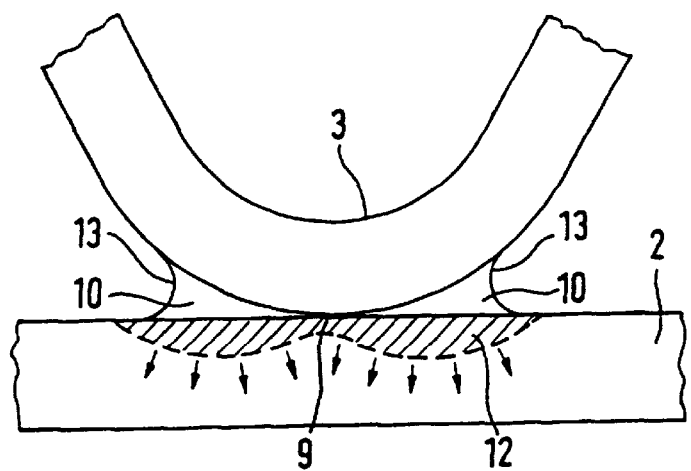
FIG. 4 is a fragmentary, elevational view of the contact location illustrated in FIG. 3 after the heat treatment.

After the homogenization operation has been concluded the temperature of the honeycomb body is raised to a brazing temperature at which the brazing material inlay 10 changes over into a liquid condition. As is seen in FIG. 4, the molten brazing material forms a meniscus 13 between the corrugated sheet metal layer 3 and the smooth sheet metal layer 2 on both sides of the contact location 9.

During the heat treatment step a part of the aluminum which forms the layer 6 can diffuse into the smooth sheet metal layer 2 at locations at which there is no brazing material. Aluminum-steel alloys have a substantially lower melting point than steel so that the inner layer 4 of the corrugated sheet metal layer 3 and the smooth sheet metal layer 2 are temporarily liquefied and an intimate join is produced in a region around the contact location 9. That join is supplemented by joins produced by a brazing action at other locations. Reference numeral 12 identifies an aluminum-containing region of the smooth sheet metal layer 2. The aluminum further migrates into the sheet metal layer 2 by virtue of the concentration gradient, as is indicated by the arrows in FIG. 4, whereby there is again a depletion in the content of aluminum in the region 12 and thereby the melting point of the region 12 rises so that the join location hardens.

Figure 5:
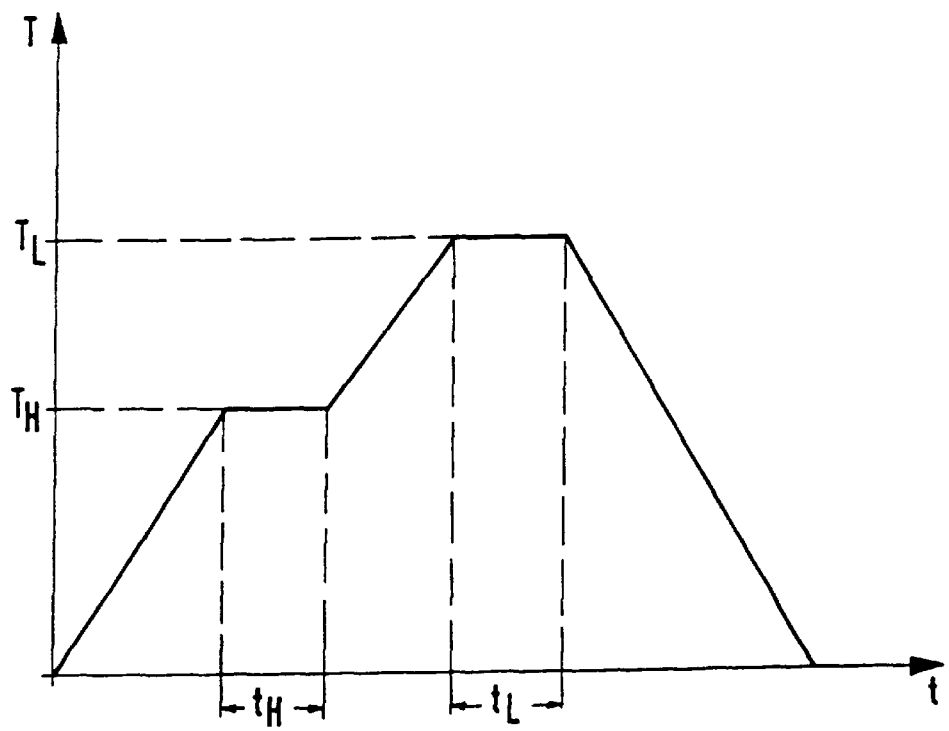
FIG. 5 is a temperature-time graph.

FIG. 5 shows a temperature-time graph. The honeycomb body is heated, for example, in a vacuum brazing furnace to a homogenization temperature $T_H$. The honeycomb body is held at the homogenization temperature for a time $t_H$ until complete homogenization of the sheet metal layers with a laminate structure has occurred. The homogenization temperature $T_H$ is below a brazing temperature $T_L$. After homogenization of the sheet metal layers with a laminate structure has occurred, the temperature within the furnace is raised to the brazing temperature $T_L$. The brazing temperature can be about 1150° C. In order to ensure that the honeycomb body is completely brazed throughout, the furnace is maintained at the brazing temperature for a time $t_L$. The brazing operation is followed by a cooling operation, in which case preferably quite small amounts of oxygen are introduced into the atmosphere in the furnace and the oxygen partial pressure within the furnace is less than 1 Torr. As a result, an aluminum oxide film or coating which can serve as a boding primer for a washcoat, is formed on the sheet metal layers 2, 3 during the honeycomb body cooling phase.

The variation in temperature in relation to time shown in FIG. 5 is given by way of example. If the honeycomb body and the furnace are of a suitable configuration, it is also possible for homogenization to already be complete by the time that the brazing temperature is attained, without the furnace having to be maintained at a predetermined homogenization temperature $T_H$ for a given time.

The process according to the invention can be used for honeycomb bodies which are formed entirely or partially of sheet metal layers that have a laminate configuration and it inexpensively results in bodies which can carry a mechanical loading, that are resistant to high-temperature corrosion and are particularly suitable for exhaust gas catalytic converters of motor vehicles.

We claim:

1. A process for producing a catalyst carrier honeycomb body for an exhaust gas system, which comprises:

initially forming structured sheet metal layers to obtain passages through which a fluid is able to flow, the structured sheet metal layers comprising a layered material having at least one chromium-containing steel layer and at least one layer containing aluminum;

subsequently substantially homogenizing the chromium-containing steel and aluminum-containing layers in a heat treatment initially under one of vacuum and a reducing atmosphere, subsequently or simultaneously subjecting the sheet metal layers to a brazing procedure in said atmosphere, and then subjecting the sheet metal layers to an oxidizing atmosphere;

the brazing procedure comprising at least partially brazing together contact locations between the structured sheet metal layers with a brazing material based on nickel and containing between 0.5 and 8% by weight of boron; and at least one of stacking and winding the structured sheet metal layers to form passages for conducting a fluid flow.

2. The process according to claim 1, which comprises carrying out the brazing procedure with a brazing material based on nickel and containing between about 3 and 6% by weight of boron.

3. The process according to claim 1, which comprises after the brazing prodedure, cooling the sheet metal layers in an atmosphere with a relatively low oxygen partial pressure.

4. The process according to claim 3, which comprises setting the oxygen partial pressure of the atmosphere at less than 1 Torr.

5. The process according to claim 1, which comprises setting a maximum brazing temperature of between about 1100 and 1150° C.

6. The process according to claim 1, which comprises carrying out the heat treatment initially in a temperature range in which the aluminum diffuses into the steel but the brazing material does not yet melt and only raising the temperature to a brazing temperature after substantial homogenization of the sheet metal layers.

* * * * *